(12) United States Patent
Sprogis

(10) Patent No.: US 7,298,271 B2
(45) Date of Patent: Nov. 20, 2007

(54) METHOD AND APPARATUS FOR PROVIDING AWARDS USING TRANSPONDERS

(76) Inventor: Peter Sprogis, 7 Johns Point, Fortune Bay, Freeport (BS)

( * ) Notice: Subject to any disclaimer, the term of this patent is extended or adjusted under 35 U.S.C. 154(b) by 295 days.

(21) Appl. No.: 11/230,049

(22) Filed: Sep. 19, 2005

(65) Prior Publication Data

US 2007/0063842 A1    Mar. 22, 2007

(51) Int. Cl.
*G08B 13/14* (2006.01)
(52) U.S. Cl. .................... 340/572.1; 705/14
(58) Field of Classification Search .......... 340/572.1; 705/14; 235/375, 376, 380, 381, 382, 385
See application file for complete search history.

(56) References Cited

U.S. PATENT DOCUMENTS

| | | |
|---|---|---|
| 4,442,507 A | 4/1984 | Roesner |
| 4,796,074 A | 1/1989 | Roesner |
| 5,095,362 A | 3/1992 | Roesner |
| 5,296,720 A | 3/1994 | Wen |
| 5,347,280 A | 9/1994 | Schuermann |
| 5,378,880 A | 1/1995 | Eberhardt |
| 5,407,851 A | 4/1995 | Roesner |
| 5,521,601 A | 5/1996 | Kandlur |
| 5,528,222 A | 6/1996 | Moskowitz |
| 5,541,604 A | 7/1996 | Meier |
| 5,550,547 A | 8/1996 | Chan |
| 5,565,846 A | 10/1996 | Geiszler |
| 5,640,002 A | 6/1997 | Ruppert |
| 5,682,143 A | 10/1997 | Brady |
| 6,100,804 A | 8/2000 | Brady |
| 6,122,520 A * | 9/2000 | Want et al. ............... 455/456.2 |
| 6,283,065 B1 | 9/2001 | Shorrock et al. |
| 6,286,763 B1 | 9/2001 | Reynolds et al. |
| 6,424,262 B2 | 7/2002 | Garber |
| 6,484,780 B2 | 11/2002 | Ashley |
| 6,563,417 B1 | 5/2003 | Shaw |
| 6,587,835 B1 * | 7/2003 | Treyz et al. .................. 705/14 |
| 6,732,081 B2 * | 5/2004 | Nicholson .................... 705/14 |
| 6,912,398 B1 * | 6/2005 | Domnitz ..................... 705/14 |
| 6,932,698 B2 | 8/2005 | Sprogis |

(Continued)

FOREIGN PATENT DOCUMENTS

GB    2 370 942 A    7/2002

(Continued)

OTHER PUBLICATIONS

Bear Stearns, Equity Research Supply Chain Technology, track(ing) to the future—The Impending RFID-Based Inventory Revolution (Jun. 2003).

*Primary Examiner*—John Tweel, Jr.
(74) *Attorney, Agent, or Firm*—Stephen C. McKenna; Gibson, Dunn & Crutcher LLP

(57) ABSTRACT

A method and system for providing awards to participants utilizing electronic data storage elements such as radio frequency identification ("RFID") tags. RFID tags containing directions to an award processing center and other unique coded information are placed at locations where customer patronage is to be encouraged. Award program participants are provided with RFID readers capable of reading the information on the RFID tag. Award program participants read the information on the RFID tag with their reader and utilize that information to access the award processing center which then provides awards to the participants, such as redeemable customer loyalty points or product coupons.

45 Claims, 2 Drawing Sheets

U.S. PATENT DOCUMENTS

| | | | |
|---|---|---|---|
| 7,152,040 B1 * | 12/2006 | Hawthorne et al. | 235/380 |
| 7,194,422 B1 * | 3/2007 | St. John Killick | 705/14 |
| 7,216,109 B1 * | 5/2007 | Donner | 235/382 |
| 2002/0139848 A1 | 10/2002 | Catan | |
| 2002/0174025 A1 | 11/2002 | Chong | |
| 2004/0186768 A1 | 9/2004 | Wakim et al. | |
| 2005/0088320 A1 | 4/2005 | Kovach | |

FOREIGN PATENT DOCUMENTS

| | | |
|---|---|---|
| WO | WO-01/37082 A1 | 5/2001 |
| WO | WO 03/052585 A2 | 6/2003 |

* cited by examiner

METHOD AND APPARATUS FOR PROVIDING AWARDS USING TRANSPONDERS

BACKGROUND (1) Field of the Invention

The present invention relates to providing awards when a person comes within a certain proximity of an electronic data storage element, such as an RFID tag.

(2) Description of Related Art

Increasing customers is a goal of many businesses. In order to increase customers, some businesses market their products, others provide discounts or coupons to customers, and still others create customer loyalty programs that reward customers for repeat patronage. Some business use all these methods and all businesses use some method to draw customers. The present invention increases patronage at business establishments by using RFID technology to provide awards to persons that visit or make purchases at such establishments.

Evolving technologies allow products or other items to be tagged with inexpensive electronic data storage elements ("EDSEs") then tracked by devices that can read the information encoded into the tag. One form of electronic data storage element is a radio frequency transponder. Radio frequency identification ("RFID") uses low-powered radio transmitters to read data stored in a transponder at distances up to 200 feet away. Present applications of this technology include tracking assets, managing inventory, automatic vehicle identification, highway tolls and authorizing payments. RFID technology is also used by certain automobile manufacturers to provide electronic keys to their automobiles.

RFID systems originated in the 1940s when the U.S. government used transponders to distinguish between friendly and enemy aircraft. Aircraft still utilize transponders today for aircraft tracking. In addition to tracking aircraft, the airline industry, along with the FAA has used RFID tags to route baggage and increase air security. In the 1970s, the U.S. government used RFID systems for tracking livestock and nuclear material. Companies such as McDonald's and Exxon Mobile have tested RFID chips to allow customers to pay for food or gas.

RFID technology is known to those skilled in the art. Commercial utilizations typically operate in a number of unlicensed frequency bands, with 125 KHz and 13.56 MHz being the most common. The greater the bandwidth the more information a RFID tag can hold. For instance, a 13.56 MHZ tag can hold as much as 2,000 bits of data, roughly 30 times the information that can be held on a 125 KHz tag. Active RFID tags are equipped with a battery that allows an active tag to transmit a signal to a reader. These tags often provide the greatest range, up to 200 feet, but are more expensive than other tags. Passive RFID tags are not battery powered. They draw power from the electromagnetic waves emitted from the receiver-transmitter. The read range of these tags is generally under three meters and the tags are inexpensive to manufacture. Semi-passive RFID tags have batteries like active RFID tags, but the battery is only used to power the tag's microchip circuitry, it does not power the transmission from the tag to the reader. Semi-passive tags also have longer read ranges than passive tags.

One example of EDSE or RFID use is inventory control. In this application, a RFID tag is placed on the item to be tracked. Up to 2,000 bits of data are stored on a memory chip that is housed in a button or integrated circuit card. Tags can also be etched on a substrate that is then embedded in a paper or plastic tag. The information stored on the tag may include a unique product identification code, the place of product manufacture and the place of sale. The tag may include a battery or it may be passive. A RFID transmitter-receiver or reader is utilized that contains a transmitter, receiver and digital control module connected to a transmitting antenna. When the control module senses a tag, it interrogates the tag (after awakening the tag if passive), decodes the data and typically passes that data on to a host system by way of wired or wireless communication. The host system assimilates the data received from the product tags and the data is used to track product inventory and sales.

The majority of RFID tags are write-once/read-only, but others offer read/write capability such that the information contained on the tag can be rewritten. For instance if tracking an item in transit, the information can be rewritten as the item travels along its route or is rerouted. RFID readers may be hand-held and wireless.

Numerous companies have developed RFID technology, including Texas Instruments (see U.S. Pat. Nos. 5,347,280 and 5,541,604), IBM (see U.S. Pat. Nos. 5,528,222; 5,550, 547; 5,521,601; and 5,682,143), Motorola/Indala (see U.S. Pat. Nos. 5,378,880 and 5,565,846), and Mikron/Philips Semiconductors (see U.S. Pat. Nos. 4,442,507; 4,796,074; 5,095,362; 5,296,722; and 5,407,851). In addition, RFID technology and tracking systems are described in numerous additional patents, including U.S. Pat. Nos. 6,424,262 and 6,484,780 to Garber, assigned to 3M (describing the use of RFID to track library materials); U.S. Pat. No. 6,100,804 to Brady, assigned to Intecmec (describing a RFID system employing a thin, flexible RFID tag and integrated antenna); U.S. patent application Ser. No. 09/823,874 by Catan (describing a system for tracking a changeable description of an article for use in a home inventory system); and U.S. Pat. No. 6,563,417 to Shaw, assigned to Identec Solutions (describing a RFID method of tracking products moving along a distribution path). Other patents and patent applications describe other uses for RFID technology. For example, U.S. patent application Ser. No. 09/859,359 by Hind describes a method for providing targeted advertising and personalized customer services using RFID tagged products and wireless communication devices and U.S. patent application Ser. No. 09/442533 by Hidary describes a system for distributing and retrieving information about an object using RFID transponders and Internet access devices. Each of the above referenced patents and their disclosures regarding EDSE or RFID technology are incorporated herein by reference.

Examples of EDSE technology and uses can also be found in the June 2003 Equity Research of Bear Stearns, titled Supply-Chain Technology: Track(ing) to the Future, The Impending RFID-based Inventory Revolution, which is also incorporated herein by reference.

SUMMARY OF THE INVENTION

The present invention involves a method for determining when a person is in a certain desired area for the purpose of providing awards to the person. The invention utilizes EDSEs, such as RFID tags, and EDSE readers. Persons who wish to earn awards are provided with EDSE readers. Persons also carry a wireless communications device, such as a cellular telephone, which may be integrated with the EDSE reader.

One or more EDSEs are placed in selected locations, for example, behind the counter at a fast food restaurant or at the entrances to a department store. Each EDSE has information stored on it to direct persons to a special award location on a processing site such as a server that is affiliated with the company sponsoring the award. When the EDSE reader comes within the proximity of the EDSE it interrogates the EDSE and reads the information stored thereon. The person then uses their wireless communications device to access the special award location on the server affiliated with the company sponsoring the award.

The special award location on the server is only accessible by using the EDSE information that directs persons to that location. For that reason, when a person accesses the special awards location, the server knows that they have come within proximity of the EDSE and are entitled to an award. The server recognizes the person by means of a unique identification code for that person, such as the person's cellular telephone number. The server then grants an award, such as a merchandise coupon or redeemable points, to the person.

The EDSE may also contain a special award code that is read by the EDSE reader and sent to the special award location of the server and correlated with an award that is given to the person. A second, additional award code may also be given to the person if a purchase is made.

All documents, including other patents and references, referred to in this document are hereby incorporated by reference in their entirety, although no documents are admitted to render any of the claims herein unpatentable either alone or in combination with any other references known by the applicant.

DETAILED DESCRIPTION

The present invention provides awards to persons in order to incentivize those persons to patronize certain businesses or other places. In the present invention, businesses or other persons place electronic data storage elements ("EDSE"s) in selected locations. The ESDEs contain information that provides directions to an award location on a host computer, such as a website. When a person carrying an EDSE reader comes within the proximity of the EDSE, the reader interrogates the EDSE and obtains the directions to the award location. The person then utilizes a wireless communications device such as a web-enabled cellular telephone to access the award location and receives an award.

Figure 1:
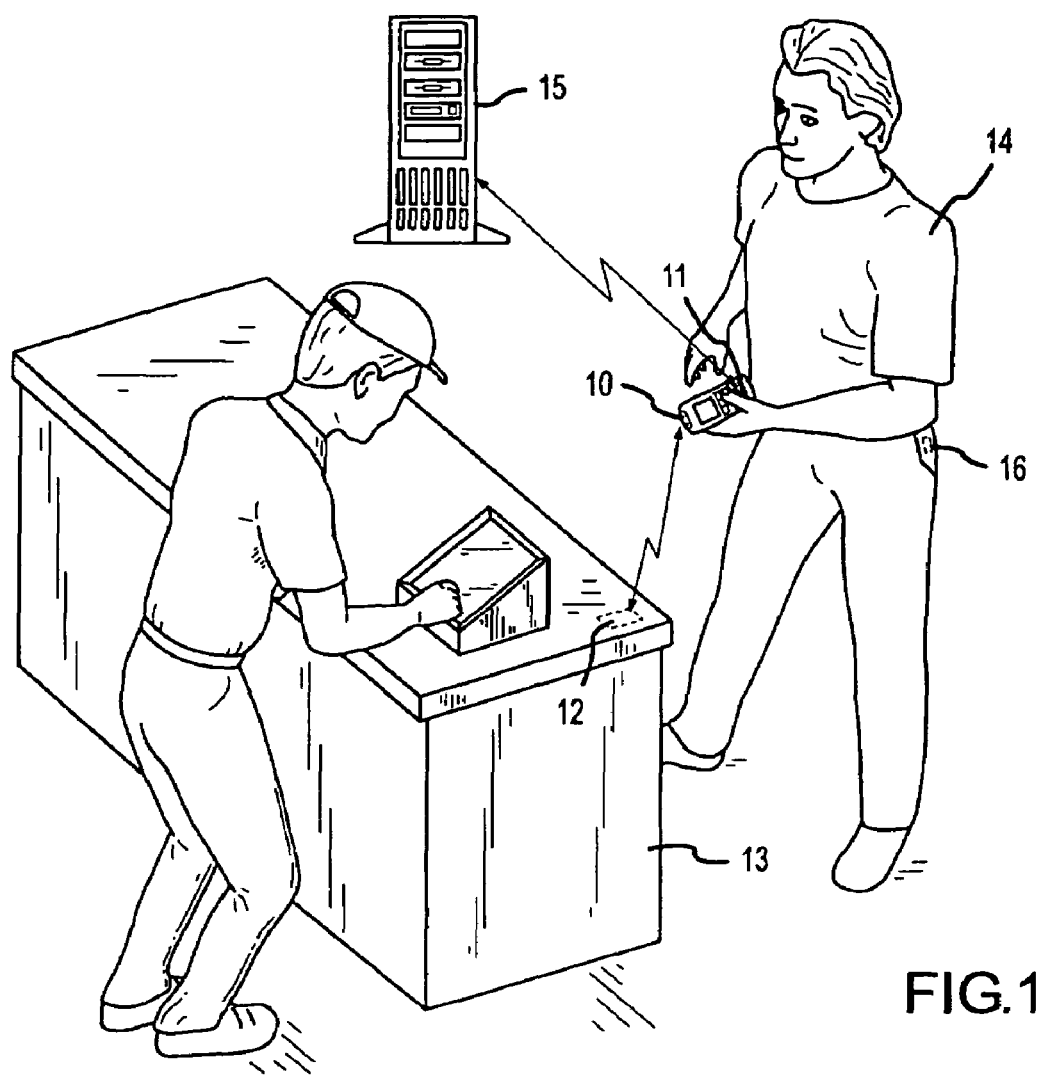
FIG. 1 depicts the components of the system and method.

Using FIG. 1, a description of a preferred embodiment of the invention is provided. A business such as a fast-food restaurant desires to increase customer traffic, both by driving more customers to its stores and also by encouraging customers to make repeat visits. It registers persons (14) who wish to participate in a promotional program, explains the program rules, and those persons who are participants in the promotional program are provided with EDSE readers (10). The participant's registration information, including a unique identification code, such as a cellular telephone number, is recorded in a database. Persons participating in the award program also carry a wireless communications device such as a web-enabled cellular telephone or Blackberry® (11). The wireless communications device and EDSE reader may be combined into a single device, such as in the Nokia Mobile RFID Kit for the Nokia 5140 and Nokia 5140i.

The restaurant places EDSEs (12) at strategic locations within its store(s), such as under the service counter (13). The EDSE's contain an address for a special award location on a website that is dedicated to providing awards to registered persons (14) that visit the restaurants.

When the person (14) enters a participating restaurant and approaches the counter (13) to place his order, the EDSE reader (10) interrogates the EDSE (12), and from it receives the Internet address of the special award location. The wireless communications device (11) then uses the Internet address to access the award location on the host computer (15). The awards location uses the telephone number of the person to identify the person and assigns an award to the person to reward their visit to the restaurant. Awards can be of any of a wide variety known in the art, including but not limited to coupons, discount certificates, free merchandise or customer loyalty points.

Figure 2:
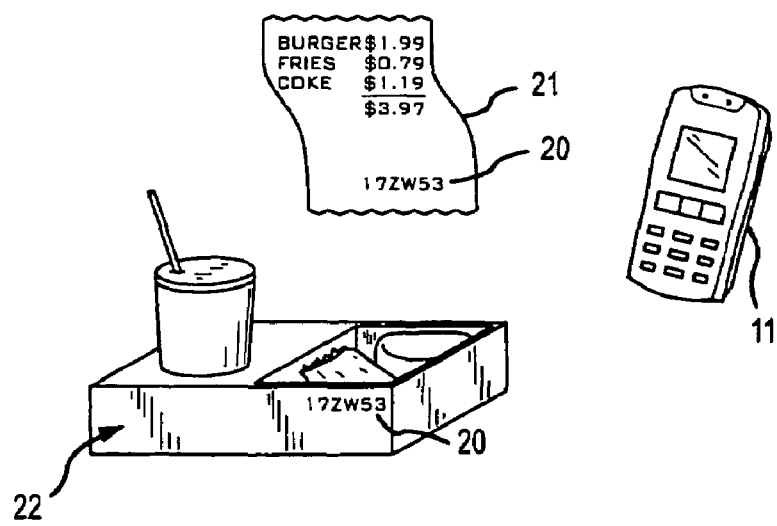
FIG. 2 depicts components used to provide awards when a purchase is made.

In order to encourage purchases, an additional step is added as in FIG. 2. As shown in FIG. 2, a special code (20) is printed on purchase receipts (21). The special code may also be incorporated into product packaging (22). The purchaser sends this special code to the awards location using their web-enabled wireless communications device (11), for example by typing in the symbols on the keypad of a cellular telephone. The awards location recognizes the special code (20) and provides an award, which may be in addition to a first award, to the person based upon the fact that a purchase was made.

In a further preferred embodiment of the present invention, EDSEs are encoded with both a prompt to provide the address of an award location and a separate code to identify the specific EDSE. The EDSE reader reads both the address and the specific EDSE identification information. The person sends the specific EDSE identification information to the awards location on the website and that location verifies that the specific EDSE identification information is accurate and up to date. For instance, in order to combat potential fraud, the restaurant could decide that it will change the EDSEs on a weekly or even daily basis. Because of the very low cost of such devices this would not be cost-prohibitive. All EDSEs used by the restaurant contain directions to the same awards location, but the EDSE identification information is changed every week. Awards are only given to persons that enter the current EDSE identification information when accessing the awards location of the website.

In another embodiment the EDSE does not contain directions to a special awards location at all. The EDSE only contains information identifying the specific EDSE. When persons register to participate in the awards program, they are provided with the awards program Internet address or a telephone number or other directions that connect them to the awards location processing center. Then, upon entering a participating location and receiving the EDSE identifying code, the participant can access the awards web-page or call the awards telephone number, enter the EDSE identifying code, and be credited with their award. As described in a previous embodiment, additional awards can be credited when a purchase is made.

One type of award envisioned by the present invention is customer loyalty points. Each time a customer visits a participating business establishment the customer is awarded a certain number of points. If the customer makes a purchase, and provides a purchase code to the awards center, the customer is awarded additional points. Points are redeemed for free products or other promotional items.

Figure 3:
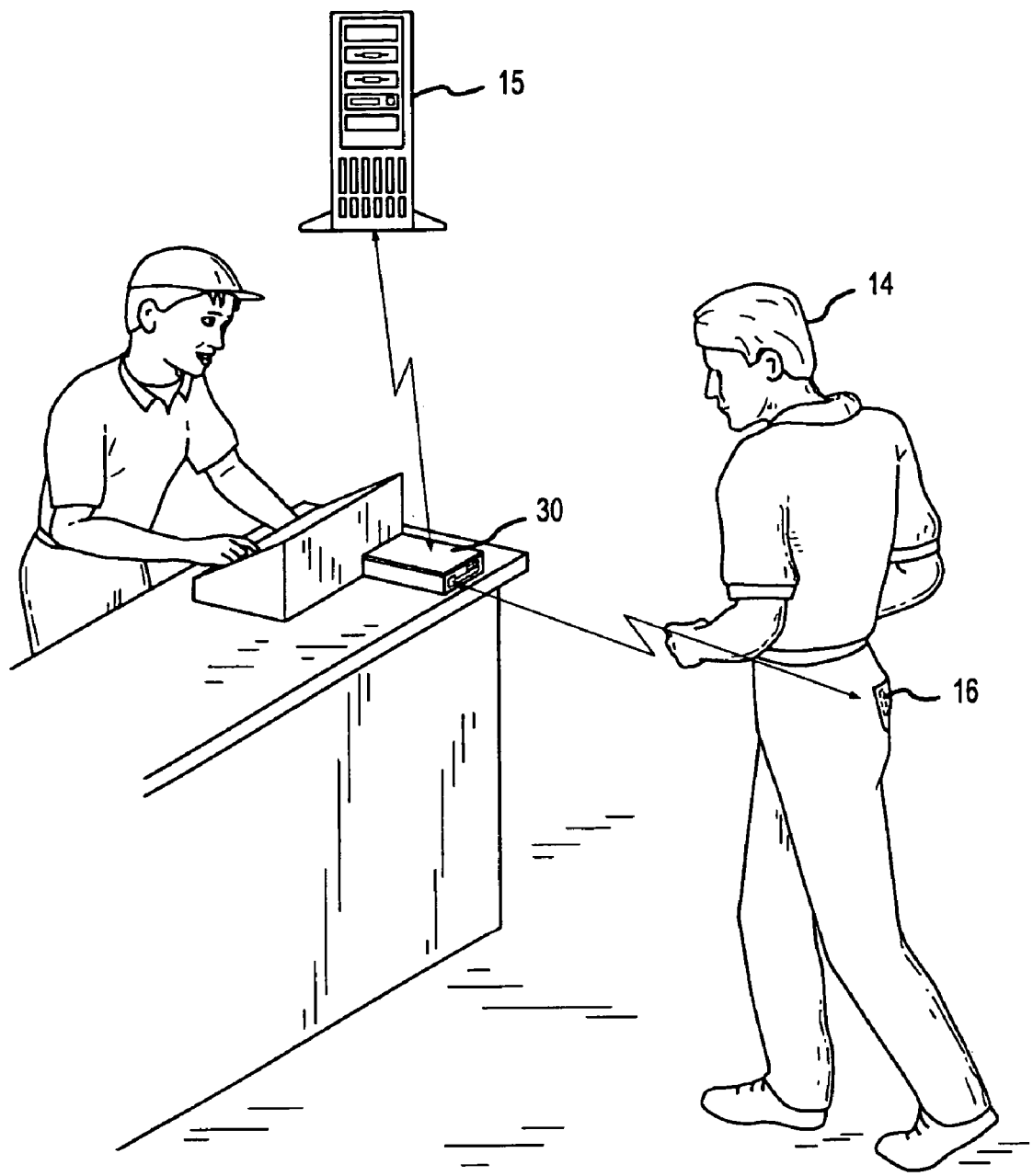
FIG. 3 depicts a further embodiment of the invention.

Another method of providing awards to customers envisioned by the present invention is depicted in FIG. 3. This embodiment involves installing EDSE readers (30) in a business establishment and providing awards program participants (14) with EDSEs (16). The EDSEs (16) provided to the customer are encoded with information that identifies the customer (14). In this method, when a customer (14) comes within close enough proximity to the EDSE reader (30) to allow the customer's EDSE (16) to be interrogated and read, the EDSE reader (30) reads the information identifying the customer and sends that information to a central processing center (15). The central processing center (15) records the fact that the customer's EDSE (16) was read at the location of the EDSE reader (30) and provides an award to the customer. The award could be, for example, a coupon for a free drink. The processing center (15) provides the free soft drink coupon to the person by any of many methods well-known in the art, for example by mail, by e-mail, or by allowing the person to pick up the coupon at a specified location.

The preceding examples provide preferred embodiments of the invention to allow those skilled in the art to practice it. The invention itself is not limited to the examples above, but is instead described by the following claims.

The invention claimed is:

1. A method of providing awards comprising:
    (a) placing one or more electronic data storage elements containing directions to an award processing center at one or more locations;
    (b) providing participants in an awards program with electronic data storage element readers;
    (c) reading said directions to said award processing center from said electronic data storage element with said electronic data storage element reader;
    (d) utilizing said directions to access said award processing center;
    (e) identifying said participant; and
    (f) providing an award to said participant.

2. The method of claim 1 wherein said electronic data storage element is a radio frequency identification tag.

3. The method of claim 1 wherein said directions to said award processing center are an Internet address and said participant accesses the award processing center by using a web-enabled wireless communications device.

4. The method of claim 1 wherein the participant is provided with a code indicating that a purchase has been made and where said code is provided to the award processing center and an award is provided.

5. The method of claim 4 wherein said code is provided on a purchase receipt.

6. The method of claim 4 wherein said code is provided on product packaging.

7. The method of claim 1 wherein the award provided is redeemable customer loyalty points.

8. The method of claim 1 where the award provided is one or more coupons for product discounts.

9. A method of encouraging customer patronage by providing awards to customers comprising:
    (a) placing one or more electronic data storage elements containing identifying information at one or more locations;
    (b) providing participants in an award program with electronic data storage element readers;
    (c) reading said identifying information from said electronic data storage element with said electronic data storage element reader;
    (d) accessing an award processing center;
    (e) transmitting the identifying information to the award processing center; and
    (f) providing an award to said participant.

10. The method of claim 9 wherein the electronic data storage elements are periodically replaced to change the identifying information.

11. The method of claim 9 wherein the electronic data storage elements are radio frequency identification tags.

12. The method of claim 9 wherein the award provided is redeemable customer loyalty points.

13. The method of claim 9 wherein the award provided is one or more coupons for product discounts.

14. The method of claim 9 wherein directions for accessing the award processing center are also read from the electronic data storage element.

15. The method of claim 9 wherein the participant is provided with a code indicating that a purchase has been made and where said code is provided to said award processing center and an award is provided.

16. The method of claim 15 wherein the code indicating that a purchase has been made is placed on a purchase receipt.

17. The method of claim 15 wherein the code indicating that a purchase has been made is placed on product packaging.

18. A method of encouraging customer loyalty and patronage comprising:
    (a) registering participants in a customer loyalty program;
    (b) providing one or more of said participants with an electronic data storage element encoded with information identifying the participant;
    (c) providing electronic data storage element readers to one or more locations;
    (d) reading the information identifying the participant from the electronic data storage element with the electronic data storage element reader; and
    (e) providing an award to the identified participant.

19. The method of claim 18 wherein a wireless communications device transmits the identifying information from the electronic data storage element to an award processing center.

20. The method of claim 18 wherein the award processing center correlates the information identifying the participant with information previously provided by the participant.

21. The method of claim 18 wherein the award provided is redeemable customer loyalty points.

22. The method of claim 18 wherein the award provided is one or more coupons for product discounts.

23. A system of providing awards comprising:
    (a) one or more electronic data storage elements containing directions to an award processing center;
    (b) electronic data storage element readers capable of reading said directions from said electronic data storage elements;
    (c) a communications device capable of using said directions to access said award processing center wherein said award processing center provides an award to an award program participant when said participant accesses said award processing center.

24. The system of claim 23 wherein said award processing center identifies said award program participant by a unique code associated with said participant's communications device.

25. The system of claim 24 wherein said participant's communications device is a web-enabled cellular telephone and said unique code associated with said communications device is the telephone number of the web-enabled cellular telephone.

26. The system of claim 23 wherein said electronic data storage elements are radio frequency identification tags.

27. The system of claim 23 wherein said award is redeemable customer loyalty points.

28. The system of claim 23 wherein said award is one or more coupons for product discounts.

29. The system of claim 23 wherein said directions to said award processing center are an Internet address and said participant uses said directions to access said award processing center over the Internet.

30. The system of claim 23 wherein the participant is provided with a code indicating that a purchase has been made and wherein said code is provided to the award processing center and an award is provided.

31. The system of claim 30 wherein said code is provided on a purchase receipt.

32. The system of claim 30 wherein said code is provided on product packaging.

33. A system for encouraging customer patronage by providing awards to customers comprising:
 (a) one or more electronic data storage elements containing identifying information;
 (b) electronic data storage element readers capable of reading said identifying information from said electronic data storage elements;
 (c) an awards processing center that provides awards to one or more participant(s) in an awards program when said participant transmits the identifying information from said electronic data storage element to the awards processing center.

34. The system of claim 33 wherein the electronic data storage elements are periodically replaced to change the identifying information.

35. The system of claim 33 wherein the electronic data storage elements are radio frequency identification tags.

36. The system of claim 33 wherein the award provided is redeemable customer loyalty points.

37. The system of claim 33 wherein the award provided is one or more coupons for product discounts.

38. The system of claim 33 wherein directions for accessing the award processing center are also read from the electronic data storage element by the electronic data storage element reader.

39. The system of claim 33 wherein the participant is provided with a code indicating that a purchase has been made and where said code is provided to said award processing center and an award is provided.

40. The system of claim 39 wherein the code indicating that a purchase has been made is placed on a purchase receipt.

41. The system of claim 39 wherein the code indicating that a purchase has been made is placed on product packaging.

42. A system of encouraging customer loyalty and patronage comprising:
 (a) one or more participant(s) in a customer loyalty program;
 (b) an electronic data storage element provided to each participant that is encoded with information identifying said participant;
 (c) electronic data storage element readers capable of reading said electronic data storage element(s);
 (d) awards that are provided to said participant when said participant's identifying information stored on said participant's electronic data storage element is read by said electronic data storage element reader and transmitted to an award processing center.

43. The system of claim 42 wherein said electronic data storage element is a radio frequency identification tag.

44. The system of claim 42 wherein the award provided is redeemable customer loyalty points.

45. The system of claim 42 wherein the award provided is one or more coupons for products discounts.

* * * * *